UNITED STATES PATENT OFFICE.

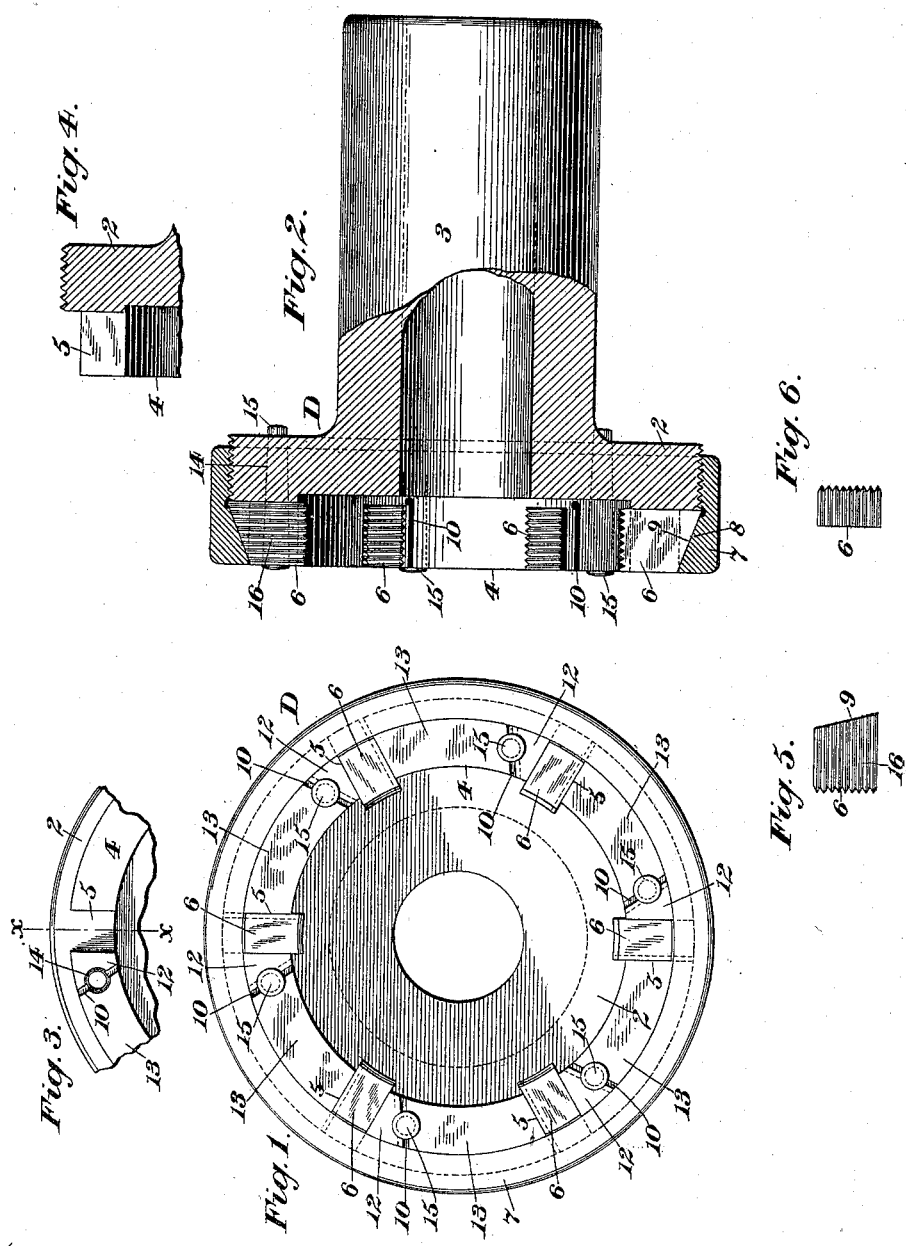

FRANK G. ECHOLS, OF HARTFORD, CONNECTICUT.

TOOL FOR CUTTING SCREW-THREADS.

SPECIFICATION forming part of Letters Patent No. 610,158, dated August 30, 1898.

Application filed March 26, 1898. Serial No. 675,222. (No model.)

*To all whom it may concern:*

Be it known that I, FRANK G. ECHOLS, a citizen of the United States, residing in Hartford, in the county of Hartford and State of Connecticut, have invented certain new and useful Improvements in Tools for Cutting Screw-Threads, of which the following is a specification.

This invention relates to a tool for cutting screw-threads; and the improved tool consists in the present case of a die which may be clamped in the turret or tailstock of a lathe and which is provided with an expansible chaser-holder having a series of chaser-seats and also having, preferably, a corresponding number of keyways, and a series of tapered chaser-locking keys is employed, the respective keys being driven in the keyways, which alternate with said seats, whereby as said keys are assembled in place the metal of the chaser-holder will be circumferentially distended to lock the chasers.

The chaser-holder is preferably annular and in the present case forms a part of the die-head, although this is not essential, and the keyways therein are oblique to the chaser-seats and preferably converge with the latter toward the axis of the tool or die, by reason of which when the tapered keys are introduced the chaser-holder is not only spread circumferentially to lock the chasers against sidewise movement, but it also is given a torsional stress of sufficient extent, which is transferred to the chasers to force them radially away from the axis of the die and firmly against a chaser retainer or collet surrounding the set of chasers and fixed upon the die-head. In other words, the lines of pressure when locking the chasers in their seats are transverse to each other, so that liability of the chasers to chatter when set or of the die as a whole being distorted are prevented, and to facilitate the purchase of the holder upon the respective chasers when the latter are locked in their seats the chasers are preferably roughened upon one of their side faces.

In the drawings accompanying and forming part of this specification, Figure 1 is a face view of my improved tool or die. Fig. 2 is a side elevation of the same with a head and a portion of the shank in central section. Fig. 3 is a face view of a portion of the head, the chaser and the taper pin being removed. Fig. 4 is a central section taken in the line $x\, x$, Fig. 3; and Figs. 5 and 6 are detail views of a chaser.

Similar characters designate like parts in all the figures of the drawings.

My improved die herein illustrated is designated by D, and it consists in the present case of a circular flat head 2, upon which the chasers and chaser-holding parts are mounted, and a hollow shank or stem which can be clamped in a turret or otherwise held to form a thread.

The chasers, which may be any number, are held in the holder 4, consisting in the present case of an annular projection on the front face of the head 2 and concentric with the axis of said head and having a series of equidistantly-disposed seats 5, in which the chasers 6 are fitted; and the head 2 and the chasers 6 are surrounded by the chaser-retainer, which consists in the present case of a ring or collet 7, which may be driven on the head 2, the two parts being preferably in threaded engagement; and said retainer or ring is beveled on its inside, as at 8, and against this bevel surface the correspondingly-beveled faces 9 of the several chasers abut when the latter are in position to form a thread.

The annular chaser-holder 4 is preferably expansible, and to secure the necessary amount of distention there is formed in the same a series of keyways each adapted to receive a wedge-shaped key, which is driven into place in a direction coinciding with the axis of the die and which serves to spread the metal, whereby the several chasers are locked firmly in place against lateral movement, and to preclude motion of the chasers in a transverse direction thereto the keyways are disposed obliquely to the chaser-seats 5 and converge with the same toward the center of the die-head 2.

By reason of the oblique disposition of the keyways adjacent to the chaser-seats a series of comparatively short movable segments is produced, and as the stock in each segment nearest its inner and free end is much thinner than the remainder thereof the segments are of a comparatively yielding nature at and around said inner ends, so that on the introduction of the several wedge-pins at points intermediate the ends of the segments each of the latter is given a slight twist and in turn forces the adjacent chaser simultaneously laterally and rearwardly against the side and end walls, respectively, of its seat.

The keyways in the chaser-holder 4 are designated by 10, and they consist in the present case of transverse slits, which may be readily produced by an ordinary cutter and which extend almost to the face of the head 2, and it will be observed that they are adjacent to the respective chaser-seats, by reason of which the holder is separated into a circuit of alternating short and elongated segments 12 and 13, respectively, the pins in each case when inserted in place spreading the stock of the shorter segment with a torsional action, which is transferred to the chasers, whereby they are forced diagonally rearward or in a direction substantially at right angles with the keyways or slits, so that the chasers are caused to abut tightly against the retaining-ring 7 and the longitudinal segments 13 and are held firmly in position for work.

The several keyways 10 are intersected approximately at their middles by the rounded tapered key-seats 14, (see Fig. 3,) adapted to receive the tapered keys 15, and which extend entirely through the head 2 of the die.

To assemble the die, the chasers 6 are first inserted in their seats, after which the retaining-ring 7 is turned on to the head 2 until the beveled surfaces 8 and 9 are substantially in contact, at which time the chasers are set by a gage, after which the taper pins 12 are driven in place to lock the chasers.

To facilitate the purchase of the holder 4 upon the several chasers, the latter are serrated or threaded on one side, as at 16, these serrations being adapted to engage the adjacent face of the holder, and they preferably correspond with or form a continuation of the cutting edges, whereby the working and holding faces of the chasers can be cut by the same tool.

In case it is desired to adjust any one of the chasers it is simply necessary to remove the tapered locking-pin 12 next adjacent to the same, so that the chaser can be moved either toward or from the center of the head, as required, and to sharpen the set the several pins will be removed, thereby releasing the chasers 6, so that they can be easily slid from their seats, and to compensate for wear due to grinding the ring 7, when the chasers are reset, will be turned slightly inward until the beveled faces 8 and 9 are contiguous.

It is evident that the faces of the long segments 13, which are engaged by the chasers, may also be serrated to conform to the serrations on the abutting faces of the chasers without departing from my invention.

Having described my invention, I claim—

1. The combination, in a screw-cutting tool provided with an expansible chaser-holder having a series of separated chaser-receiving seats and keyways, said keyways extending entirely across the chaser-holder, of a series of chasers; a ring surrounding the chasers; and a series of keys adapted to be driven in the keyways to expand the chaser-holder.

2. The combination, in a screw-cutting tool provided with an expansible chaser-holder having a series of chaser-seats and also having keyways oblique to the chaser-seats, of a series of chasers, and keys adapted to be driven in the keyways to spread the chaser-holder.

3. The combination, in a screw-cutting tool provided with an expansible chaser-holder having a series of chaser-seats and also having keyways oblique to and which converge with the chaser-seats toward the axis of the tool, of a series of chasers, and keys adapted to be driven in the keyways to spread the chaser-holder.

4. The combination, in a screw-cutting tool having a head, of an annular expansible chaser-holder on the head, having a series of chaser-seats and also having keyways oblique to and adjacent to the respective seats; a series of chasers; and keys adapted to be driven in the keyways to spread the chaser-holder.

5. The combination, in a screw-cutting tool consisting of a shank and a head, said head being provided with an annular expansible chaser-holder having a series of chaser-seats and also having keyways extending entirely across said chaser-holder, the chaser-seats and keyways alternating and being separated and adjacent, of a series of chasers; a chaser-retaining ring removably fitted upon the head and surrounding the chasers; and a series of tapered keys adapted to be driven in the keyways to spread the chaser-holder.

6. The combination, in a screw-cutting tool provided with an expansible chaser-holder having a series of chaser-seats and also having keyways oblique to the chaser-seats, of a series of chasers serrated upon one side, the serrated portions being adapted to engage the chaser-holder, and keys adapted to be driven in the keyways to spread the chaser-holder.

7. The combination, in a screw-cutting tool having a head provided with an annular chaser-holder having a series of key-seats and also having a series of diagonal slits alternating with the chaser-seats and adjacent, respectively thereto, and having rounded tapered key-seats, of a series of chasers, and a series of keys adapted to be driven in said key-seats thereby to spread the chaser-holder.

FRANK G. ECHOLS.

Witnesses:
E. D. CLARK,
HENRY BISSELL.